Figure 1:
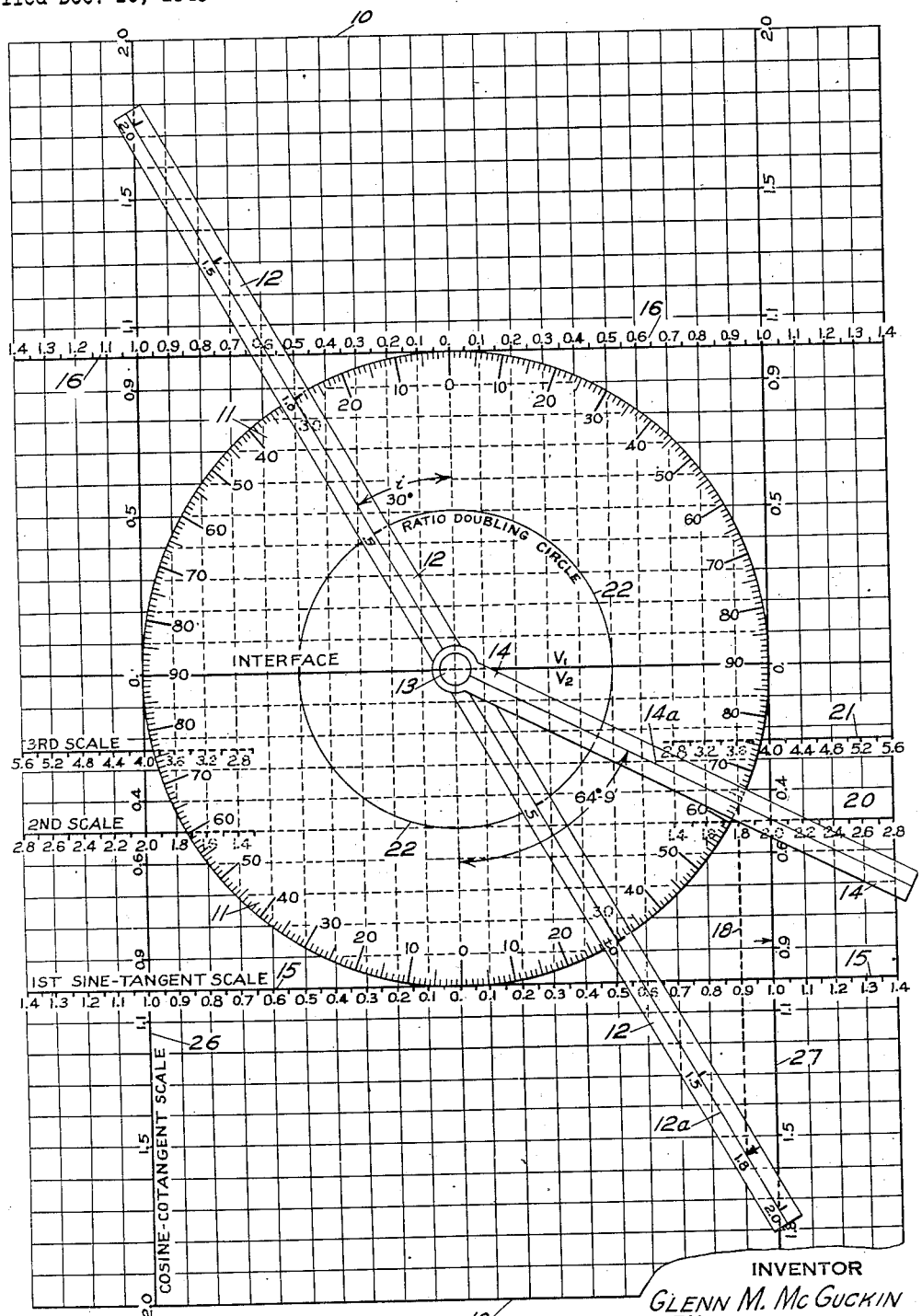

March 8, 1949.　　　G. M. McGUCKIN　　　2,463,789
REFRACTED RAY CALCULATING DEVICE
Filed Dec. 10, 1946　　　　　　　　　　　　2 Sheets-Sheet 1

INVENTOR
GLENN M. McGUCKIN
BY
Sidney A. Johnson
ATTORNEY

March 8, 1949.    G. M. McGUCKIN    2,463,789
REFRACTED RAY CALCULATING DEVICE
Filed Dec. 10, 1946    2 Sheets-Sheet 2

INVENTOR
GLENN M. McGUCKIN
BY
Sidney A. Johnson
ATTORNEY

Patented Mar. 8, 1949

2,463,789

UNITED STATES PATENT OFFICE 2,463,789

REFRACTED RAY CALCULATING DEVICE

Glenn M. McGuckin, Corpus Christi, Tex., assignor, by mesne assignments, to Socony-Vacuum Oil Company, Incorporated, New York, N. Y., a corporation of New York Application December 10, 1946, Serial No. 715,213

5 Claims. (Cl. 235—61)

This invention relates to calculating devices, particularly to a device or instrument useful in quickly and accurately solving problems based upon Snell's law.

The invention will be found particularly useful in utilizing the data secured as a result of seismic surveys although the invention is not limited to such use since it may be applied to problems of every kind involving Snell's law. This law is well known to those familiar with physics, and states the relation between the incident angle and the refracted angle upon the passage of a ray or seismic wave between strata of differing velocity chracteristic. If a ray or seismic wave of energy traverses one medium at a certain velocity, and approaches at an angle the interface of said medium with a second medium, the ray or wave of energy will be refracted at the interface and transmitted through the second medium at a refraction angle such that $$\frac{\sin i}{\sin r} = \frac{V_1}{V_2}$$

where $i$ = the incident angle at the interface
$r$ = the refracted angle at the interface
$V_1$ = the velocity in the first medium, and
$V_2$ = the velocity in the second medium.

In determining the path of seismic waves through the earth, from a large collection of data, Snell's law must be tediously solved over and over again in order to determine the unknowns. Sometimes the angles will be known and the velocity ratio will represent the unknown to be determined. At other times the velocity ratio will be known together with one of the angles, and the problem is then to determine the other angle.

In carrying out the invention in one form thereof, there is provided an instrument which includes a base member having a circle graduated in degrees from zero to 90° in both directions to a horizontal diameter from each intercept of the circle with a vertical diameter. There is provided an arm pivoted at the center of the circle and having a line extending diametrically of the circle and outwardly therefrom. The arm is graduated from the center of the circle outwardly to form the velocity ratio scale. By means of associated lines graduated in trigonometric functions, the instrument lends itself to the ready solution of all problems involving Snell's law.

Figure 2:
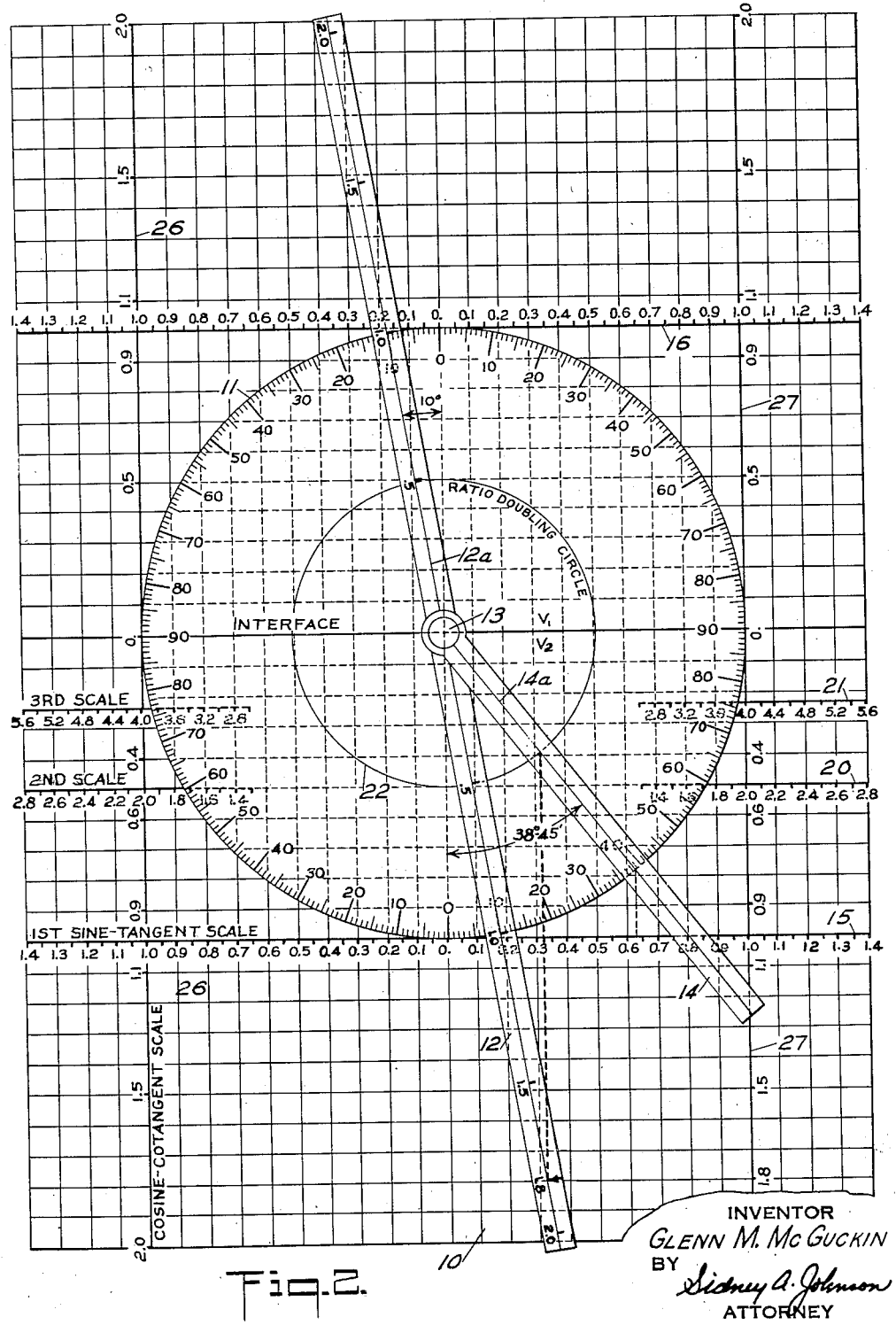

For a more detailed description of the invention and for further objects and advantages thereof, reference is to be had to the accompanying drawings, in which:

Fig. 1 is a plan view of an instrument embodying the invention, with the arms thereof in position for the solution of a typical problem; and Fig. 2 is a plan view of the device with the arms in position for the solution of a different typical problem.

Referring now to Fig. 1, the calculating instrument consists of a base 10 of any suitable material, such as heavy Celluloid, a synthetic plastic, or it may be of metal although for accuracy it is preferred that the base member shall be of a material which has a relatively low coefficient of expansion as the result of temperature changes. On the base member 10, or on an element attached thereto, is inscribed a circle 11 graduated in degrees and fractions thereof. From each intercept of a vertical diameter with the circle, the scale extends from zero to 90° in both directions. An arm 12 is pivoted by suitable means 13 to the base member 10, which pivot means is also utilized for pivotal mounting of a second or refractor arm 14. The incident arm 12 and the refractor arm 14 are preferably constructed of a transparent material such as Celluloid and each has inscribed in and along the mid-portion thereof the lines 12a and 14a which extend diametrically and radially of the circle 11.

The incident arm 12 also carries a scale which represents the velocity ratio of Snell's law, above set forth. This scale starts at the center of the circle and extends in both directions therefrom. Its value at the edge of the circle is unity and, as illustrated, the ratio-scale goes from zero to slightly above 2. It may be extended by lengthening the arm 12. A first sine-tangent scale 15 extends on both sides of the mid-point of the lower half of the circle 11 and a similar sine-tangent scale 16 is provided for the upper half of the circle. Both scales are tangent to the circle 11.

As appears in Fig. 1, the incident arm 12 is set at 30°. Accordingly, if a vertical line from the point of intersection of the center line of arm 12 with the circle is followed (as shown by the broken line) to the sine-tangent scale 15, it will be observed that it intersects that scale at the value 0.5, which is, of course, the value of the sine for a 30-degree angle. If the point of intersection of the center line of arm 12 with the scale 15 be read, the tangent value of 0.577 will be determined.

The horizontal diameter of the circle 11 represents the interface between the two media under study. Accordingly, when the velocity $V_1$ is the same in the media above the interface as the velocity $V_2$ in the media below the interface, the ratio of the two velocities will be unity, and, as has already been explained, the value of unity is taken on the arm 12 as the radius of the circle 11.

In explaining a typical use of the calculating instrument, it will be assumed that the incident angle $i$ is 30 degrees and the ratio of the velocity of a seismic wave through two media, $V_2/V_1$, is equal to 1.8. The ratio of 1.8 is read on the arm 12 as indicated by the arrow and a vertical line 18 therefrom is then followed to its point of intersection with the circle 11. The angle to the point of intersection is then read from the circle and is determined to be 64°9′, this being the angle of refraction of the wave which intersected the interface at an incident angle of 30 degrees. Of course, in the drawing the angle of refraction cannot be read to the accuracy of one minute. However, the drawing is intended as exemplary of the invention. In actual practice the circle 11 will have as many graduations as it is convenient to apply thereto. If the diameter is large enough, the circle 11 may be graduated so that it can be read to an accuracy of one minute. Similarly, the associated scales may be read to additional decimal points, on larger sizes the size of the instrument. While the base member 10 and the circle 11 may be unitary, the circle may be in the form of a disk attached to the member 10. The arms 12 and 14 though conveniently made of a transparent material may be opaque, in which event a side of such opaque arm would coincide with and form the respective indicia lines 12a and 14a.

Again returning to the vertical line 18, its point of intersection with the sine-tangent scale 15 may be read to determine the sine of the angle 64°9′, which is 0.90.

In finding the tangent of this angle, it will be observed the line of the arm 14 does not intersect the sine-tangent scale 15. However, there is a second sine-tangent scale 20 which the arm 14 does intersect and from which the tangent is determined as 2.065. It will be observed the second scale 20 overlaps the scale 15; that is, if the arm 14 be moved to a point on scale 20 to coincide with a tangent value of 1.4 for 54°28′, it will also intersect the same value on the scale 15. Similarly, a third scale 21 is provided and additional scales may be added for the determination of tangent values as high as may be desired and in keeping with the accuracy of the particular instrument to which the invention has been applied.

In some problems the ratio of $V_2$, the velocity in the second medium to the velocity $V_1$ in the first medium, may exceed the values found on the scale of the arm 12. However, it will be remembered that this scale was determined by taking the radius of the circle 11 to determine the point of unity on the ratio scale. Accordingly, by drawing a circle 22 of one-half the radius of circle 11, the effect will be to double the values of the ratio scale on the arm 12. The use of the inner circle will be explained in detail in connection with Fig. 2 where, it will be observed, the arm 12 has been set for an incident angle of 10°.

It will be further assumed that the ratio of $V_2/V_1$ is equal to 3.6. Accordingly, one-half of this value is read on the ratio scale; that is, 1.8 as indicated by the arrow. A vertical line is then followed from the reading of 1.8 up to its point of intersection with the inner circle 22. The refraction arm 14 is then moved until its line coincides with the point of intersection. The refraction angle is then read on the circle 11 and determined to be 38°45′. A vertical line to the sine-tangent scale 15 determines the sine to be 0.626 while the point of intersection of the line of arm 14 with the scale 15 gives the value of the tangent as 0.80.

The foregoing examples of the use of the calculating instrument are typical but do not limit the use thereof to problems of that type. With problems of that type, however, it will be observed many answers are readily obtained without reference to tables of functions of angles, calculating machine operations or other time-consuming operations. The instrument is direct reading and quickly presents the solution of Snell's law together with associated data which may be needed in connection with the solution of other particular problems.

The instrument is useful in the solution of problems which involve the determination of the critical angle of incidence for refraction of the seismic wave along an interface where the only information known is the ratio of $V_1/V_2$. For example, if the ratio is 0.333, which would be obtained with weathering and subweathering velocities of 2,000 feet and 6,000 feet per minute, the value $V_1/V_2$ or 0.333 would be taken as the value of the sine of the angle. This would be read on the upper scale 16 of Fig. 1 and a vertical line followed therefrom to its point of intersection with the circle 11. The angle of incidence would then be determined by reading the left-hand quadrant of the scale of circle 11 and would be found to be 19°27′. The horizontal offset for any depth could then be read on the incident angle arm 12 using equal horizontal and depth scales, with the pivot the origin of both scales.

If desired, the instrument may also be provided with cosine-cotangent scales 26 and 27 which are tangent to the circle 11 at the points of intersection therewith of the horizontal diameter. Thus, in Fig. 1, the cosine of 30 degrees is determined by following horzontally a line from the angle 30 as read on circle 11 by the arm 12. Such horizontal line intersects the cosine-tangent scale, as indicated by the arrow, to show its value as 0.866. Similarly, the line of arm 12 intersects the scale 27 at 1.73, the value of the cotangent of 30 degrees.

While a preferred form of the invention has been described in detail, it is to be understood that modifications may be made within the scope of the appended claims.

What is claimed is:

1. An instrument of the character described, comprising a base member having a circle graduated in degrees from 0 to 90 degrees in both directions from each intercept with a vertical diameter to a horizontal diameter thereof and at least one trigonometric scale parallel to said horizontal diameter and calibrated for direct reading from angles read on said circle, a first arm pivoted about an axis at the center of said circle and having a line extending diametrically of said circle, said arm having graduations from the center of said circle outwardly along said arm forming a velocity-ratio scale, and a second arm pivoted about said axis at the center of said circle having a line corresponding with a radius of said circle and movable into a position corresponding with a refraction angle, said base member having a series of vertical lines for vertical transfer of a reading from one to the other of said ratio scale and of said graduated circle.

2. An instrument of the character described, comprising a base member having a circle graduated in degrees from 0 to 90 degrees in both directions from each intercept with a vertical diameter to a horizontal diameter and a sine-tangent scale parallel to said horizontal diameter and calibrated for direct reading from angles from 0 to 90 degrees as read on said circle, a first arm pivoted about an axis at the center of said circle and having a line extending diametrically of said circle, said arm having graduations from the center of said circle outwardly along said arm forming a velocity-ratio scale, and a second arm pivoted about said axis at the center of said circle having a line corresponding with a radius of said circle and movable into a position corresponding with a refraction angle, said base member having a series of vertical lines for vertical transfer of readings between said ratio scale and said graduated circle, said vertical lines also intercepting said sine-tangent scale for transfer of readings between graduations of said circle and said scale of sine values.

3. An instrument of the character described, comprising a base member having a circle graduated in degrees from 0 to 90 degrees in both directions from each intercept with a vertical diameter to a horizontal diameter, and an arm pivoted about an axis at the center of said circle and having a line extending diametrically of said circle and outwardly thereof, said arm having graduations from the center of said circle outwardly along said arm forming a velocity-ratio scale, with unity value equal to the radius of said circle, said base member having a series of vertical lines for vertical transfer of a reading from one to the other of said ratio scale and said graduated circle, and said base member having a ratio-doubling circle of smaller diameter for increasing the scale values of said velocity-ratio scale in the same ratio as the radius of said first-named circle is to the radius of said doubling circle.

4. An instrument of the character described, comprising a base member having a circle graduated in degrees from 0 to 90 degrees in both directions from each intercept with a vertical diameter to a horizontal diameter, and an arm pivoted about a vertical axis at the center of said circle and having a line extending diametrically of said circle and outwardly thereof, said arm having graduations from the center of said circle outwardly along said arm forming a velocity-ratio scale, with unity value equal to the radius of said circle, said base member having a series of vertical lines for vertical transfer of a reading from one to the other of said ratio scale and said graduated circle, said base member having a ratio-doubling circle of smaller diameter for increasing the scale values of said velocity-ratio scale in the same ratio as the radius of said first-named circle is to the radius of said doubling circle, and a second arm pivoted about said axis at the center of said circle having a line corresponding with a radius of said circle and movable into a position corresponding with a refraction angle for transferring readings from said doubling circle to said first-named circle.

5. An instrument of the character described comprising a base member having at least one quadrant of a circle graduated in degrees from 0 to 90 degrees, said base member having at least one scale parallel to the 90-degree radius of said circle and graduated in values of a trigonometric function, two members mounted for independent pivotal movement about the center of said circle, one of which has a radial velocity-ratio scale and the other a radial index, and said base member having lines parallel to the 0-degree radius of the circle for cooperation with said scales and index in solution of problems involving Snell's law.

GLENN M. McGUCKIN.

REFERENCES CITED

The following references are of record in the file of this patent:

UNITED STATES PATENTS

| Number | Name | Date |
| --- | --- | --- |
| 1,048,044 | Craig | Dec. 24, 1912 |
| 1,575,911 | Gomez | Mar. 9, 1926 |
| 2,078,138 | Hansen | Apr. 20, 1937 |